United States Patent [19]

Sain

[11] Patent Number: 5,199,324

[45] Date of Patent: Apr. 6, 1993

[54] ADJUSTABLY VARIABLE PEDAL APPARATUS AND METHOD

[75] Inventor: Charles J. Sain, Albuquerque, N. Mex.

[73] Assignee: Saisan Partners, Albuquerque, N. Mex.

[21] Appl. No.: 762,930

[22] Filed: Sep. 19, 1991

[51] Int. Cl.$^5$ ............................ G05G 1/14; B62M 3/08
[52] U.S. Cl. .................................. 74/594.4; 74/594.3; 74/594.6; 36/131
[58] Field of Search .................. 74/594.3, 594.4, 594.6, 74/594.7, 560; 36/131

[56] References Cited

U.S. PATENT DOCUMENTS

| | | | |
|---|---|---|---|
| 610,175 | 9/1898 | Flindall | 74/594.4 |
| 2,749,771 | 6/1956 | Pearl | 74/594.4 |
| 3,788,163 | 1/1974 | Gause et al. | 74/594.6 |
| 4,103,563 | 8/1978 | Genzling | 74/594.6 X |
| 4,335,628 | 6/1982 | Shimano | 74/594.4 |
| 4,599,915 | 7/1986 | Hlavac et al. | 74/594.4 |
| 4,625,580 | 12/1986 | Burt | 74/594.3 X |
| 4,899,618 | 2/1990 | Christol | 74/594.6 |
| 4,942,778 | 7/1990 | Bryne | 74/594.6 |
| 5,078,026 | 1/1992 | Giffin | 74/594.6 X |

FOREIGN PATENT DOCUMENTS 3908157  9/1989  Fed. Rep. of Germany ..... 74/594.6

Primary Examiner—Rodney H. Bonck
Assistant Examiner—Andrea Pitts
Attorney, Agent, or Firm—Deborah A. Peacock; Donovan F. Duggan; Dennis F. Armijo

[57] ABSTRACT

A pedal assembly for bicycles, velocipedes, and the like is disclosed wherein the pedal is adjustably attached to the crank arm at a predetermined angle of inclination to or perpendicular to the crank arm. Rotation of the crank arm varies the angle of inclination of the pedal; the predetermined angle of inclination is the sum of first incremental angle provided by a beveled cam and a second incremental angle provided by an inclined pedal platform.

Also disclosed is a quick-release pedal-and-cleat structure in the pedal assembly.

13 Claims, 4 Drawing Sheets

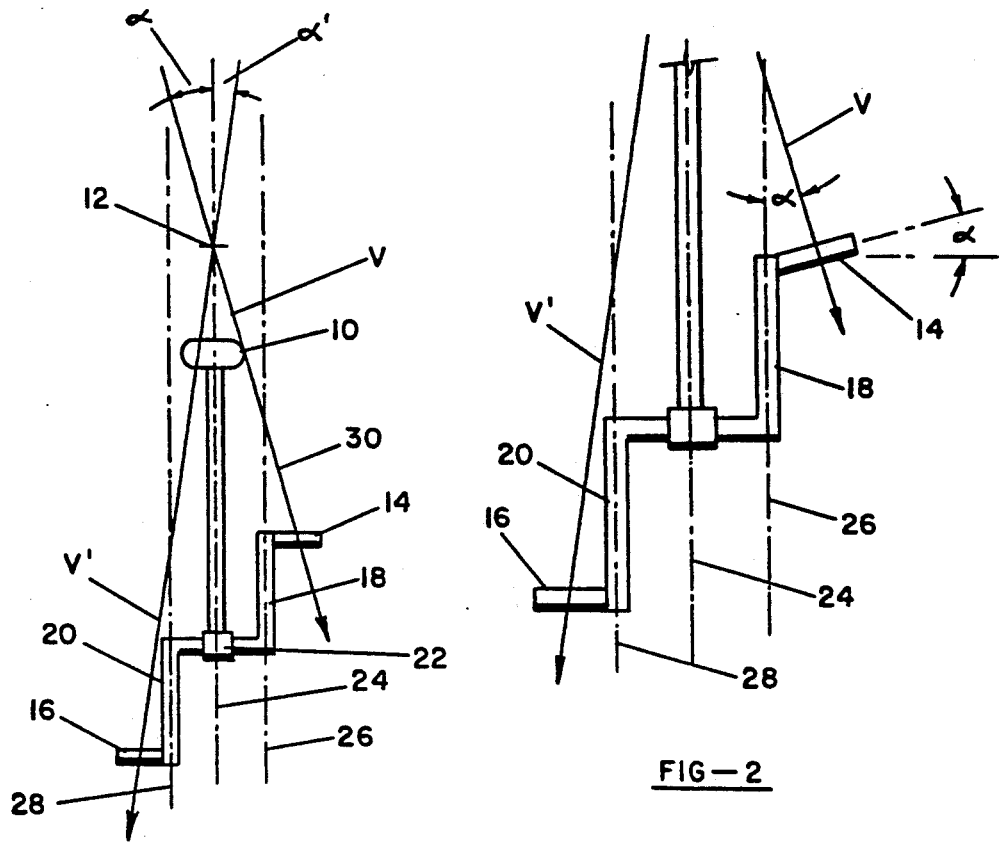
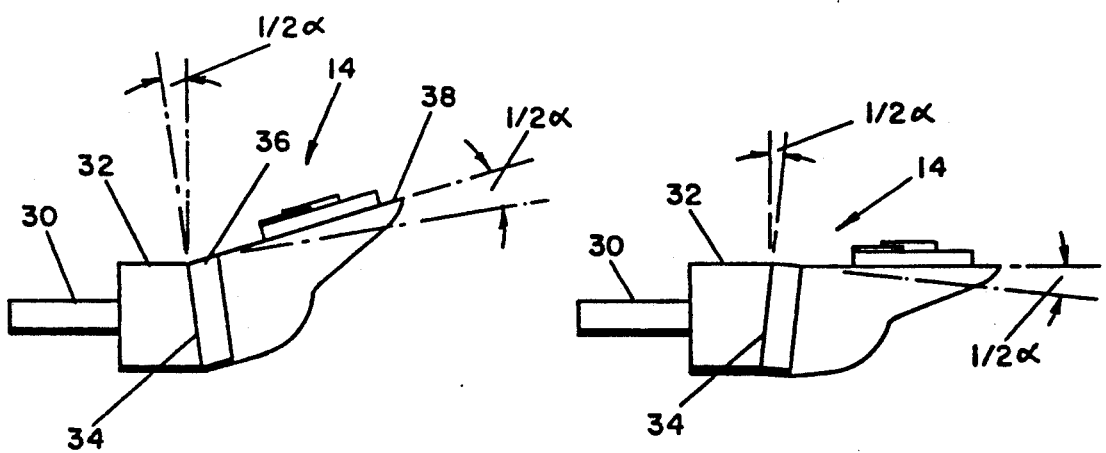
FIG—1  FIG—2
FIG—3a  FIG—3b

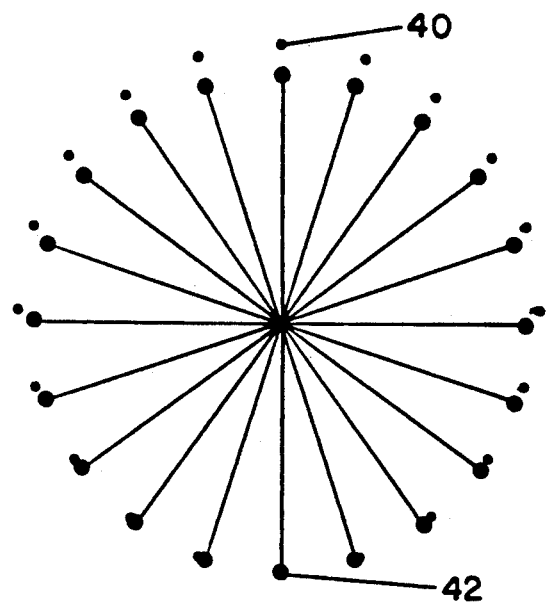
FIG—4
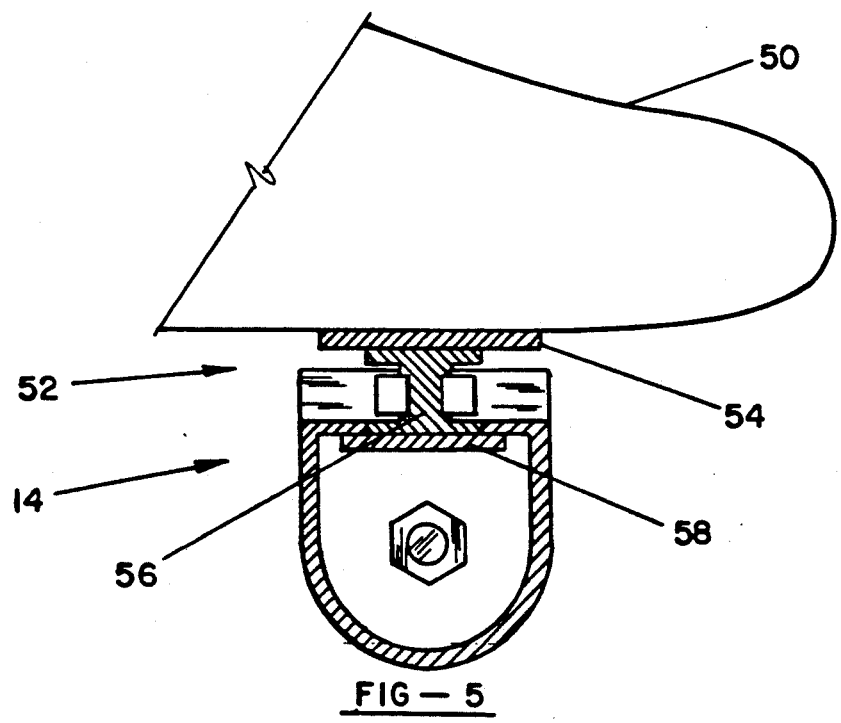
FIG—5

ADJUSTABLY VARIABLE PEDAL APPARATUS AND METHOD

BACKGROUND OF THE INVENTION

Field of the Invention (Technical Field)

The present invention relates to an adjustably variable offset pedal for bicycles, velocipedes, exercise bicycles, and the like; and a method of using such pedal.

Background Art

The popularity of the sport of cycling has increased tremendously in recent years. New materials and alloys have greatly decreased weight-to strength ratios; improved transmissions have likewise improved pedaling efficiency and application of torque.

Nevertheless, considerable efficiency is lost at the point where the force is directly applied—between the rider's feet and the pedals of the cycle—because the cyclist's legs are offset from the centerline of the cyclist's body.

U.S. Pat. No. 4,942,778, to Bryne, entitled *Clipless Bicycle Pedal System*, discloses a bicycle pedal system wherein a cleated plate with a concave recess, affixed to a rider's shoe, engages a convex pedal surface. This system, while maintaining engagement between pedal and foot, necessarily involves some slippage therebetween.

U.S. Pat. No. 2,749,771, to Pearl, entitled *Pedal Elevators*, relates only to pedal adapters for raising the height of the pedal surface, for example, for use by a child with relatively short legs. No improvement in pedaling efficiency is disclosed.

U.S. Pat. No. 610,175, to Flindall, entitled *Velocipede Pedal Crank*, discloses structure for lengthening or shortening crank arm length automatically in response to speed and torque requirements. No angular variation or adjustment of vectors is disclosed.

U.S. Pat. No. 4,335,628, to Shimano, entitled *Pedal for a Bicycle*, discloses a bicycle pedal with front and rear foot-bearing surfaces having different surfaces of revolution, thereby preventing slipping of the cyclist's foot.

U.S. Pat. No. 4,625,580, to Burt, entitled *Bicycle Pedal Mechanism*, discloses a bicycle pedal mounted upon cams such that an oscillatory to and fro movement is provided. This movement shortens the time the pedal is in top and bottom dead center positions.

U.S. Pat. No. 4,599,915, to Hlavac, et al., entitled *Adjustable Pedal*, perhaps most relevant, discloses a cycle pedal adjustable in three planes of movement, including inverted and everted foot positions. Once adjusted, however, no further variation in application of the force vector appears possible.

SUMMARY OF THE INVENTION

The preferred embodiment of the invention comprises a pedal assembly comprising pedals, crank arms having axes, and the pedals are adjustably attached to the crank arms at predetermined angles of inclination to perpendiculars to the crank arm axes, thereby varying the angles of inclination during rotation. The pedals are inclined at a first incremental angle of the predetermined angle by a cam. The pedals are also inclined at a second incremental angle of the predetermined angle by inclined pedal platforms. The sum of the first and second incremental angles equals the predetermined angle, and bearings are interposed between the cam and the pedal platform.

The preferred embodiment of the invention further comprises attachment apparatus for releasably securing a rider's foot to the cycle pedals comprising cleats attached to the rider's foot and receptacles on the pedals for receiving the cleats, whereby the cleats may execute rotational, nutational, and translational motion within the receptacle. The cleats may be fixedly or releasably secured within the receptacles. The cleats may further be attached to a rider's shoe, and the receptacles may comprise slots having bearings and spring-biased keepers.

The preferred method of the invention comprises the steps of providing a pedal, providing a crank arm having an axis, and adjustably attaching the pedal, to the crank arm at a predetermined angle of inclination to a perpendicular to the axis, wherein rotation of the crank arm varies the angle of inclination. The preferred method of the invention further comprises the steps of inclining the pedal at first and second incremental angles of the predetermined angle, wherein the sum of the first and second incremental angles equals the predetermined angle.

The preferred method of the invention further comprises the step of providing bearings and providing a receptacle in the pedal for releasably engaging a cleat attached to the cyclist's foot.

An object of the invention is the provision of a pedal platform that more efficiently transfers applied force from the rider.

Another object of the invention is the provision of a pedal platform which reduces rider stress and fatigue.

Yet another object of the invention is the provision of an adjustable pedal platform, the angular orientation of which varies as it is rotated.

Still another object of the invention is the provision of a quick-detachable cleat enabling efficient and safe pedal engagement and disengagement.

An advantage of the invention is that each pedal may be independently adjusted to an individual rider.

Another advantage of the invention is its simplicity and ease of attachment.

Yet another advantage of the invention is the reliability and safety of the pedal-and-cleat attachment.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 1 is a schematic representation of cycling force vectors;

FIG. 2 is a schematic representation of the optimum application of pedaling force vectors;

FIG. 3(a) is a schematic representation of the preferred embodiment of the present invention applied to a pedal at top dead center;

FIG. 3(b) is a schematic representation of the preferred embodiment of the present invention applied to a pedal at bottom dead center;

FIG. 4 is a schematic representation of the variation of the pedal angle of inclination through rotation;

FIG. 5 is a side cross-section of another aspect of the invention;

Figures 6A, 6B, 6C:
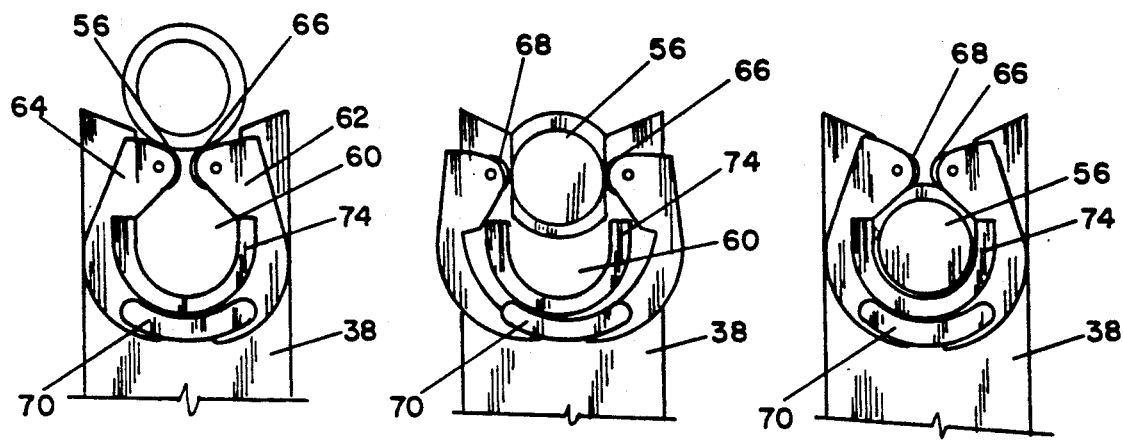
FIG. 6(a) is a top view of a pedal cleat about to enter the pedal slot.
FIG. 6(b) a top view of a pedal cleat entering the pedal slot.
FIG. 6(c) is a top view of a pedal cleat fully lodged within the pedal slot.

DESCRIPTION OF THE PREFERRED EMBODIMENT (BEST MODE FOR CARRYING OUT THE INVENTION)

FIGS. 1 and 2 provide schematic illustrations of the vectors normally involved in cycling, showing the cycle seat 10, and the rider's center of mass (or gravity) 12. Pedals 14,16 are shown, respectively, at top and bottom dead center positions. Pedals 14,16 are attached to crank arms 18,20 respectively, which, in turn, are mounted for rotation at hub 22; all of which are conventional.

A central plane 24 intersects hub 22, seat 10, and center of mass 12. Planes 26,28 bisect and coincide with the longitudinal axes of crank arms 18 and 20, respectively, and are parallel to central plane 24. Force vectors V and V' originate at the rider's center of mass 12, intersecting and bisecting pedals 14 and 16, respectively. Maximum pedaling force is transmitted when vectors V,V' intersect pedals 14,16 at right angles, as depicted in FIG. 2.

The intersection between central plane 24 and the upper extensions of vectors V,V' define angles $\alpha$ and $\alpha'$, respectively. Angles $\alpha,\alpha'$ constantly vary between a maximum and minimum value as crank arms 18,20 are rotated; the amount of such variation will vary with each individual rider and, indeed, may vary with each leg of a particular rider. Angles $\alpha,\alpha'$ are normally a maximum when the pedals are at top dead center, and a minimum when the pedals are at bottom dead center.

With reference to FIGS. 1 and 2, angles $\alpha,\alpha'$ are also defined as the angles between the horizontal and that pedal tilt or inclination necessary for vectors V,V' to intersect pedals 14,16 at right angles for optimum force transmission. However, any practical solution designed to maintain force vectors V,V' normal to pedals 14,16, respectively, must take into account the constant variation of angles $\alpha,\alpha'$ with crank arm rotation.

FIGS. 3(a) and 3(b) schematically illustrate the desideratum of the preferred embodiment of the invention. FIG. 3(a) illustrates pedal 14 at top dead center, while FIG. 3(b) shows pedal 14 at bottom dead center. Pedal 14 comprises threaded shaft 30 fixedly attached to pedal crankshaft 18 in any desired rotational configuration; by, for example, a locknut or other means well known to those skilled in the art. Shaft 30 further comprises and is integral with cam 32. Cam 32 comprises beveled surface 34 outboard thereof. Beveled surface 34 is inclined at an angle of approximately $\alpha/2$ relative to the vertical, as illustrated in FIG. 3(a).

Intermediate beveled surface 34 and pedal platform 38 is bearing assembly 36. Bearing assembly 36 may comprise a single or double race bearing assembly and may further comprise ball bearings, roller bearings, or any other bearing structure well known in the art. The only requirement is the provision of relative rotation between cam 32 and pedal platform 38.

Pedal platform 38, as illustrated in FIGS. 3(a) and 3(b), is likewise inclined at an angle of $\alpha/2$. Thus, the combined bevel angle of cam 32 and inclination angle of pedal platform 38 equals angle $\alpha$ (or $\alpha'$). FIG. 4 schematically indicates the variations of angle $\alpha$ or $\alpha'$ between maximum at top dead center 40 and minimum at bottom dead center 42 and positions in between. Practically, angles $\alpha$, $\alpha'$ may comprise any desired value depending upon cycle configuration, rider height and size, type of cycle, and other factors well known to those ordinarily skilled in the art. Normally, each $\alpha$ and $\alpha'$ preferably comprises an angle of between 0° and 30°, inclusive. Further, the bevel angle of cam 32 and inclination angle of pedal platform 38 need not, of course, be exactly $\alpha/2$ or $\alpha'/2$. Any other fractional values are permissible, so long as the combined total of such subangles is $\alpha$ or $\alpha'$.

Initial adjustment of angle $\alpha$ or $\alpha'$ is made by rotating cam 32 until beveled surface 34 presents the desired fraction of angle $\alpha$ or $\alpha'$ at top dead center. Cam 32 is then fixed in position to crankshaft 18 relative to pedal platform 38 at top dead center. Pedal platform 38 thereafter rotates relatively to cam 32 by virtue of interposed bearing assembly 36.

Another feature of the preferred embodiment of the invention is shown in FIGS. 5 and 6. FIG. 5 depicts a rider's shoe 50 comprising improved quick release pedal engagement cleat 52 mounted thereon. Cleat 52 further comprises plate 54 attached to shoe 50 by sewing, gluing, strapping, "rat trap" attachment, or other securement means well known to those ordinarily skilled in the art.

Plate 54 further comprises downwardly depending post 56 with flange 58 fixedly attached thereto.

As shown in FIGS. 6(a)–6(c), pedal platform 38 comprises slot or receptacle 60 complementary to post 56 and flange 58. Slot 60 is intermediate in the width dimension between the diameter of post 56 and the diameter of flange 58 shown in FIG. 5, being of greater width than the diameter of post 56 and of less width than the diameter of flange 58. Thus with post 56 within slot 60 and flange 58 below slot 60, post 56 can move slightly relative to slot 60, but upward disengagement is prevented by flange 58. Slot 60 comprises, for example, semicircularly-shaped spring-loaded keepers 62,64 mounted at the outboard end and on each side of slot 60. Other keeper shapes, for example, square or rectangular, may also be used. Each keeper 62,64 further comprises roller bearings 66,68 respectively, at the outboard end of each keeper. Slot 60 further comprises upstanding wall portion 74 attached to pedal platform 38 at the inboard end of slot 60. Keepers 62,64 are spring-loaded and thereby biased to a relatively closed position by spring follower 70 and spring 72, as shown in FIG. 7.

In use, as depicted in FIGS. 6(a)–6(c), a rider with cleat 52 attached to his shoe 50 inserts post 56 and flange 58 laterally inwardly into slot 60, thereby spreading keepers 62,64 and allowing entry of post 56 into slot 60 while flange 58 lodges below slot 60. Keepers 62,64 are then returned to a relatively closed position by spring 72.

Post 56, being of lesser diameter than the width of slot 60, is free to rotate, nutate, and translate slightly within slot 60. Upward disengagement of post 56, however, is prevented by flange 58, which is lodged below the bottom of slot 60. Quick disengagement of cleat 52, for example, in the event of a potential fall or upset, is easily achieved, however, by lateral outboard movement of cleat 52 relative to pedal platform 38, thereby opening spring-loaded keepers 62,64.

Figure 7:
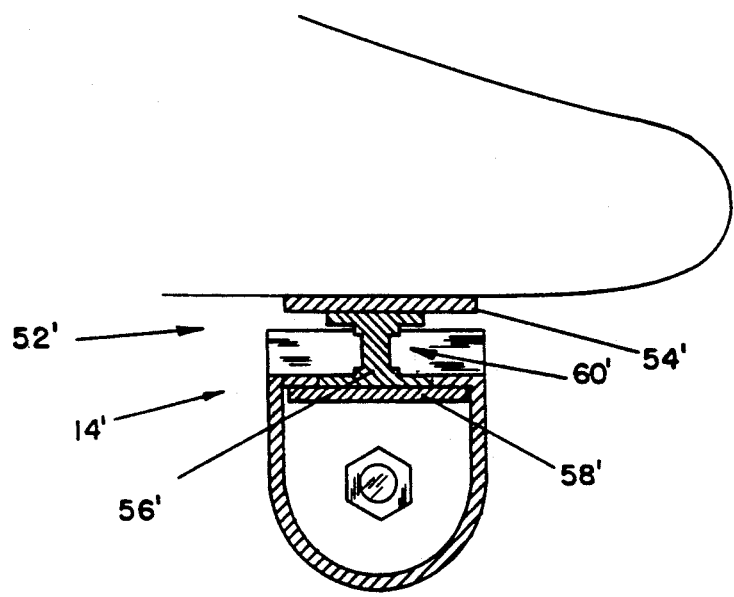
FIG. 7 is an alternative embodiment of the pedal engagement apparatus.

FIG. 7 depicts an alternative embodiment of pedal engagement apparatus. Binding 50' may comprise, for example, a quick-release, spring-loaded cage binding permitting easy disengagement of a cyclist's foot therefrom. Cage binding 50' further comprises post 56' and flange 58' fixedly attached to cage 50' in any suitable manner, and secured within pedal recess 60'. The diameter of recess 60' is slightly larger than post 56', but less than the diameter of flange 58', whereby post 56' and flange 58' are retained within recess 60'. Accordingly, post 56' can execute full rotational movement and slight nutational and translational movement within recess 60', thus permitting "toe in, toe out" pedaling motion. Recess 60' may comprise any desired configuration, for example, spherical, circular, oval, square, rectangular, and the like. Flange 58' may likewise comprise any suitable configuration, such as a ball, cylinder, and the like. Other bindings and binding configurations may be used with the invention and will occur to those ordinarily skilled in the art. For example, strap bindings, cleated bindings, and the like, may all be used with the present invention, the only requirement being attachment of post 56' and flange 56' to the binding.

Figure 8:
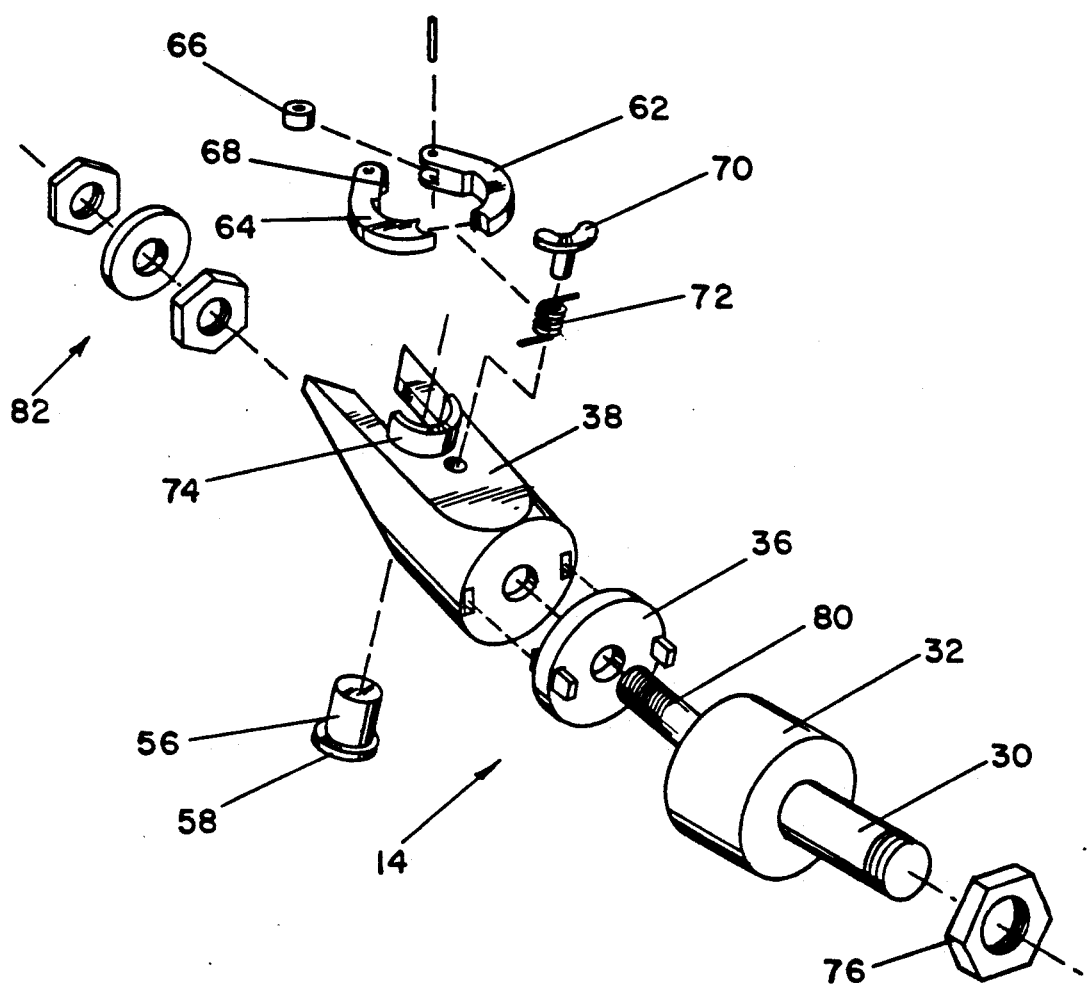
FIG. 8 is an articulated view of the invention.

FIG. 8 shows an exploded or articulated view of the preferred embodiment of the invention. Pedal 14 is attached to pedal crankshaft 18 by threaded shaft 30 and secured thereto by locknut 76, or the like, thereby preventing relative rotation between threaded shaft 30 and pedal crankshaft 18.

The other end of threaded shaft 30 is integral with and attached to cam member 32. Cam member 32, generally cylindrical in shape, bears a beveled surface 34 as the outboard face thereof. Beveled surface 34 is normally beveled at an angle of $\alpha/2$ or the like relative to the vertical, as depicted in FIGS. 3(a) and 3(b).

Threaded bolt 80 extends perpendicularly to beveled surface 34 and is secured thereto. Bearing assembly 36 is interposed between beveled surface 34 and inboard face of pedal platform 38 (see FIGS. 3(a) and 3(b)). Bearing assembly 36 enables relative rotation between cam 32 and pedal platform 38.

Initial adjustment involves rotation of cam 32 and shaft 80 relative to pedal platform 38, at top dead center. When the desired angular increment of angle $\alpha$ (or $\alpha'$) is attained, securing assembly 82 (depicted as a nut-and-washer assembly) is tightened to secure cam 32 in the desired position.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

What is claimed is:

1. A pedal assembly comprising:
   pedal means;
   crank arm means having an axis;
   means for adjustably attaching said pedal means to said crank arm means at a predetermined angle of inclination to a perpendicular to said axis, wherein rotation of said crank arm varies said angle of inclination as a function of crank arm rotation angle;
   means for inclining said pedal means at a first incremental angle of said predetermined angle of inclination; and
   means for inclining said pedal means at a second incremental angle of said predetermined angle of inclination.

2. The invention of claim 1 wherein said means for inclining said pedal means at said first incremental angle of said predetermined angle of inclination comprises cam means.

3. The invention of claim 1 wherein said means for inclining said pedal means at said second incremental angle of said predetermined angle of inclination comprises pedal platform means.

4. The invention of claim 1 wherein the sum of said first incremental angle and said second incremental angle equals said predetermined angle of inclination.

5. The invention of claim 1 further comprising bearing means between said two inclining means.

6. The invention of claim 1 wherein said means for adjustably attaching said pedal means to said crank arm means further comprises locking means.

7. The invention of claim 1 wherein said pedal means further comprises receptacle means for releasably engaging cleat means attached to a cyclist's foot.

8. The invention of claim 7 wherein said receptacle means comprises:
   keeper means;
   bearing means mounted on said keeper means; and
   spring means biasing said keeper means, thereby releasably retaining said cleat means in said receptacle means.

9. A method of assembling a pedal assembly comprising the steps of:
   a) providing a pedal;
   b) providing a crank arm having an axis;
   c) adjustably attaching the pedal to the crank arm at a predetermined angle of inclination to a perpendicular to the axis, wherein rotation of the crank arm varies the angle of inclination as a function of crank arm rotation angle;
   d) inclining the pedal at a first incremental angle of the predetermined angle of inclination; and
   e) inclining the pedal at a second incremental angle of the predetermined angle of inclination.

10. The method of claim 9 wherein the sum of the first incremental angle and the second incremental angle equals the predetermined angle of inclination.

11. The method of claim 9 wherein the step of adjustably attaching the pedal to the crank arm further comprises the step of locking the pedal to the crank arm at the first incremental angle of the predetermined angle of inclination.

12. The method of claim 9 wherein the step of providing a pedal further comprises the step of providing a receptacle in the pedal for releasably engaging a cleat attached to a cyclist's foot.

13. A pedal assembly comprising:
    pedal means;

crank arm means having an axis; and
means for adjustably attaching said pedal means to said crank arm means at a predetermined angle of inclination to a perpendicular to said axis, wherein rotation of said crank arm varies said angle of inclination as a function of crank arm rotation angle;
said pedal means comprising receptacle means for releasably engaging cleat means attached to a cyclist's foot, said receptacle means comprising:
keeper means;
bearing means mounted on said keeper means; and
spring means biasing said keeper means, thereby releasably retaining said cleat means in said receptacle means.

* * * * *